United States Patent
Mol et al.

(10) Patent No.: US 7,444,888 B2
(45) Date of Patent: Nov. 4, 2008

(54) METHOD AND SENSOR ARRANGEMENT FOR LOAD MEASUREMENT ON ROLLING ELEMENT BEARING

(75) Inventors: Hendrik Anne Mol, Sleeuwijk (NL); Gerrit Cornelis Van Nijen, Maurik (NL)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 10/564,991

(22) PCT Filed: Jul. 16, 2004

(86) PCT No.: PCT/NL2004/000516
§ 371 (c)(1),
(2), (4) Date: Jul. 12, 2006

(87) PCT Pub. No.: WO2005/008204
PCT Pub. Date: Jan. 27, 2005

(65) Prior Publication Data
US 2007/0074587 A1  Apr. 5, 2007

(30) Foreign Application Priority Data
Jul. 18, 2003 (NL) .................................. 1023948

(51) Int. Cl.
*G01L 3/14* (2006.01)
(52) U.S. Cl. ............................................... 73/862.322
(58) Field of Classification Search ............ 73/862.322
See application file for complete search history.

(56) References Cited

U.S. PATENT DOCUMENTS

| | | | |
|---|---|---|---|
| 5,140,849 A | 8/1992 | Fujita et al. | |
| 5,566,273 A * | 10/1996 | Huang et al. | 706/25 |
| 5,952,587 A | 9/1999 | Rhodes et al. | |
| 6,535,135 B1 * | 3/2003 | French et al. | 340/682 |
| 6,571,632 B1 * | 6/2003 | Browner et al. | 73/593 |
| 6,647,798 B2 | 11/2003 | Yoshida et al. | |
| 6,687,623 B2 * | 2/2004 | Bailey et al. | 702/42 |
| 6,916,118 B2 * | 7/2005 | Ito | 384/448 |

(Continued)

FOREIGN PATENT DOCUMENTS

FR   2 826 117 A1   12/2002

OTHER PUBLICATIONS

International Search Report dated Nov. 9, 2004.

*Primary Examiner*—Edward Lefkowitz
*Assistant Examiner*—Octavia Davis
(74) *Attorney, Agent, or Firm*—Buchanan Ingersoll & Rooney PC

(57) ABSTRACT

Method and sensor arrangement for determining a contact force vector acting on a rolling element bearing in operation. Sensor signals are received from a plurality of sensors measuring performance characteristics of the rolling element bearing. The received sensor signals are processed to determine the contact force vector. The plurality of sensors are arranged to measure a bearing component deformation, and the step of processing comprises the step of determining the contact force vector using an inverse transformation of a finite element analysis model which describes the rolling element bearing. The finite element analysis model is simplified using at least one generalized mode shape, the at least one generalized mode shape being a mathematical description of a natural mode deformation of a component of the rolling element bearing, such as the inner or outer ring.

15 Claims, 1 Drawing Sheet

Figure 1:
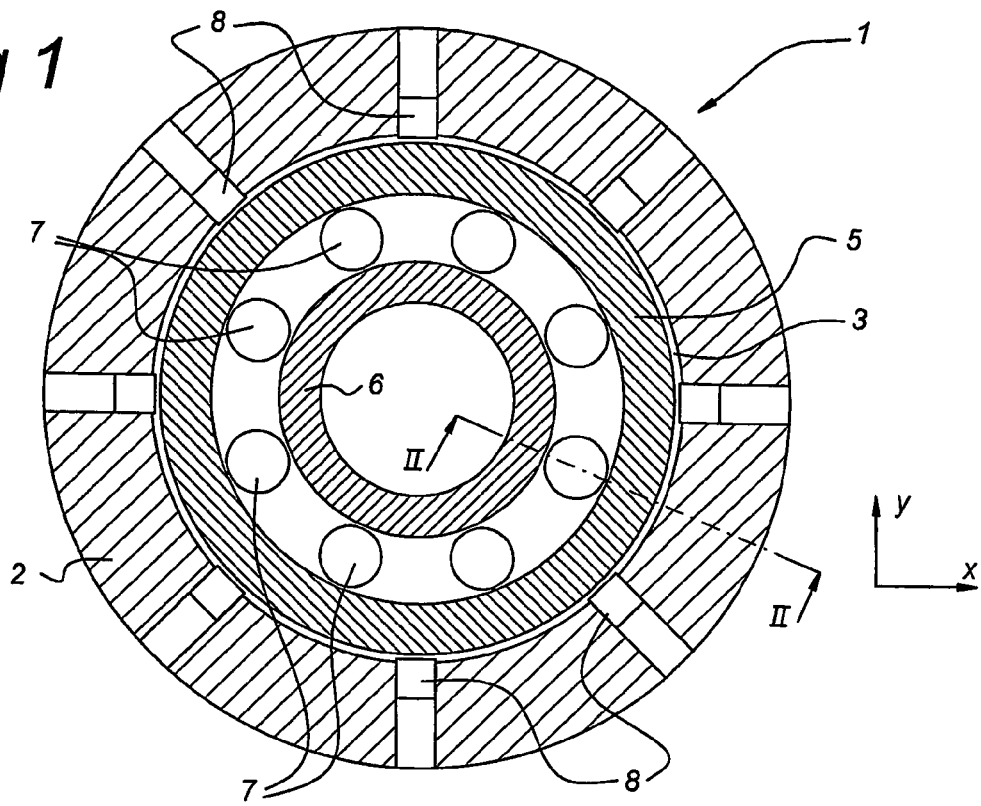

U.S. PATENT DOCUMENTS 7,240,570 B2 *  7/2007  McDearmon  .......... 73/862.322
7,249,891 B2 *  7/2007  Aoki et al.  .................. 384/448
RE39,838 E *  9/2007  McDearmon  ................ 73/795
2002/0194927 A1  12/2002  Yoshida et al.

* cited by examiner

METHOD AND SENSOR ARRANGEMENT FOR LOAD MEASUREMENT ON ROLLING ELEMENT BEARING

This application is a U.S. national phase application of International Application No. PCT/NL2004/000516 filed on Jul. 16, 2004 and designating the U.S. This application is also based on and claims priority under 35 U.S.C. § 119(a) with respect to Netherland Application No. 1023948 filed on Jul. 18, 2003, the entire content of which is hereby incorporated by reference.

The present invention relates to load measurements on rolling element bearings, such as ball bearings or roller bearings. More specifically, the present invention relates to a method and sensor arrangement for determining a contact force vector acting on a rolling element bearing in operation, the rolling element bearing comprising an inner ring, an outer ring and a number of rolling elements between the inner and outer ring, the method comprising the steps of receiving sensor signals from a plurality of sensors measuring performance characteristics of the rolling element bearing, and processing the received sensor signals to determine the contact force vector.

Such a load measuring method is e.g. known from American patent U.S. Pat. No. 5,140,849, which describes a rolling element bearing with a sensor unit. The sensor unit comprises two sensor elements, in the form of strain gauges, which effectively measure a number of performance characteristics of the bearing, including the applied load, rotational speed and acceleration.

However, this known sensor arrangement is not capable of measuring the total load vector applied to the bearing. Presumptions are made based on the bearing configuration (mostly empirical) how the load on the bearing is sensed by the two sensor elements, and thus how the load on the bearing can be determined from the sensor element signals. Also, due to the non-linear nature of a bearing, a relative straightforward vibration measurement method using the ball pass frequency is not sufficient to determine the loading on the bearing in a general sense.

The present invention seeks to provide an improved method and sensor arrangement for determining the load on a roller bearing, which is capable to determine the complete load vector on the bearing, i.e. three orthogonal force components and two moments (the moment around the rotation axis of the bearing being of no importance).

According to a first aspect of the present invention, a method is provided according to the preamble defined above, in which the plurality of sensors are arranged to measure a bearing component deformation, and the step of processing comprises the step of determining the contact force vector using an inverse transformation of a finite element analysis model which describes the rolling element bearing. The bearing component of which a deformation is measured using the sensors, may be the inner or outer ring, or even one of the rolling elements.

This method has the advantage that it is possible to determine the load vector in all orthogonal dimensions on all positions of the rolling element bearing component described by the finite element analysis model, by using measurements of the component deformation.

In a preferred embodiment of the present method, the finite element analysis model is simplified using at least one generalised mode shape, the at least one generalised mode shape being a mathematical description of a natural mode deformation of a component of the rolling element bearing, such as the inner or outer ring. This embodiment is based on the insight that a component of a rolling element bearing deforms according to a specific natural mode shape. A generalised mode shape describes a natural mode deformation of the component, i.e. the static and dynamic movements of the component, using a generalised mass, stiffness and damping matrix. This use of at least one generalised mode shape drastically reduces the number of equations to be solved for determining the load vector: a finite element model of a component comprising tens of thousands of elements can be reduced to a few hundred generalised mode shapes.

In a further embodiment, the simplified model has the form:

$$\bar{s}(\omega) = \bar{\bar{T}}_m \bar{\bar{K}}_p^{-1} \left( \frac{\partial F(\bar{\theta}, \bar{\alpha})}{\partial \bar{p}} \bar{f}_c(\omega) + \bar{f}_e(\omega) \right)$$

in which
$\bar{s}(\omega)$ is a set of measurement points where the deformations are measured at a frequency $\omega$;
$\bar{\bar{T}}_m$ is a subset of a transformation matrix $\bar{\bar{T}}$ used for the calculation of a stiffness matrix $\bar{\bar{K}}_p$ for the simplified model, the stiffness matrix $\bar{\bar{K}}_p = \bar{\bar{T}}^T \bar{\bar{K}}_{FEM} \bar{\bar{T}}$, $\bar{\bar{K}}_{FEM}$ being a stiffness matrix of a finite element analysis model of the component;
$\bar{p}$ is the vector describing the deformation of the component;
$\bar{\theta}$ is the co-ordinate in circumferential direction of the component;
$\bar{\alpha}$ is the co-ordinate perpendicular to the component;
F is a set of shape functions as used for the simplified modeling of the component;
$\bar{f}_c$ is a vector comprising the contact forces working in points with co-ordinates stored in the vectors $\bar{\theta}$ and $\bar{\alpha}$; and
$\bar{f}_e$ is a vector comprising other forces acting on the component,
and the step of determining the contact force vector $\bar{f}$ comprises the step of solving the simplified model equations for $\bar{f}_c$, $\bar{\theta}$ and $\bar{\alpha}$ and summing the contact forces according to $\bar{f} = f(\bar{f}_c, \bar{\theta}, \bar{\alpha})$.

The specific set of equations forming the simplified model may be quickly and accurately solved to determine the load vector $\bar{f}$.

In a further embodiment of the present invention, only the sensor signals at a rolling element pass frequency $\omega_{bp}$ are considered in the simplified model. As the vector $\bar{f}_e$, representing external forces on the component are substantially zero at the rolling element pass frequency, this further simplifies the task of solving the set of equations.

In an even further embodiment of the present invention, the sensors are positioned at the same pitch as the rolling elements, and the simplified model takes the form of $$|\bar{s}(\omega_{bp})| = \bar{\bar{T}}_m \bar{\bar{K}}_p^{-1} \frac{\partial F(\bar{\theta}, \bar{\alpha})}{\partial \bar{p}} |\bar{f}_c(\omega_{bp})|,$$

and the step of determining the contact force vector $\bar{f}$ comprises the step of solving the simplified model equations for $|\bar{f}_c|$ and $\bar{\alpha}$ and summing the contact forces according to $\bar{f} = f(\bar{f}_c, \bar{\alpha})$. By positioning the sensors at the same pitch as the rolling elements, the effect of the phase can be eliminated in the simplified model, even further reducing the computational task of solving the set of equations.

The number of sensors is preferably equal to the number of rolling elements. This provides enough signal information to accurately determine the solution to the set of equations, without obtaining an overdetermined set of equations.

In an even further embodiment, the contact angle of the force vector acting on the rolling element bearing is equal to a predetermined value, and the number of the plurality of sensors is equal to the number of loaded rolling elements. As the contact angle $\alpha$ of the force vector is known in this situation, less information is needed (i.e. less sensor elements) to solve the set of equations. E.g., in the case of a radial loaded bearing in which only three rolling elements carry the fill load vector, it is sufficient to only determine the deformation at these three locations, thus requiring only three sensors.

In case of an angular contact ball bearing, the force vector angle $\alpha$ is known, and it is sufficient to use N sensors, N being equal to the number of loaded rolling elements, e.g. three.

In a further aspect, the present invention relates to a sensor arrangement for determining a contact force vector acting on a rolling element bearing in operation, the rolling element bearing comprising an inner ring, an outer ring and a number of rolling elements between the inner and outer ring, the sensor arrangement comprising processing means and a plurality of sensors connected to processing means, and the processing means being arranged to execute the present method steps.

Such a sensor arrangement allows to determine the complete force vector in five degrees of freedom in a quick and accurate manner. The sensor arrangement is very accurate, and also is independent from the temperature, mounting and interface conditions of the rolling element bearing.

The sensors which are used may advantageously comprise strain gauges or other types of sensors suitable to measure a deformation or displacement of a surface, such as the outer bearing ring.

In an even further embodiment, the processing means comprise a neural network, the neural network being trained to provide the contact force vector as an output using input signals from the plurality of sensors. This provides a very efficient solution for the complex modeling of the bearing (component) mechanics.

The bearing inner ring or outer ring are, in a further embodiment, attached to a sensor holder, a circumferential recession being provided between at least part of the contacting surfaces of the inner ring or outer ring and the sensor holder. The circumferential recession allows the local deformation of the inner or outer ring under the influence of the vector force acting on the bearing and transmitted by the rolling elements.

Figure 2:
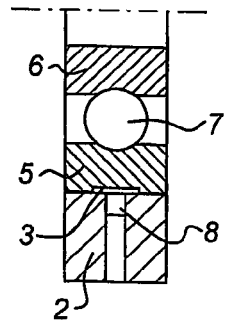
Figure 3:
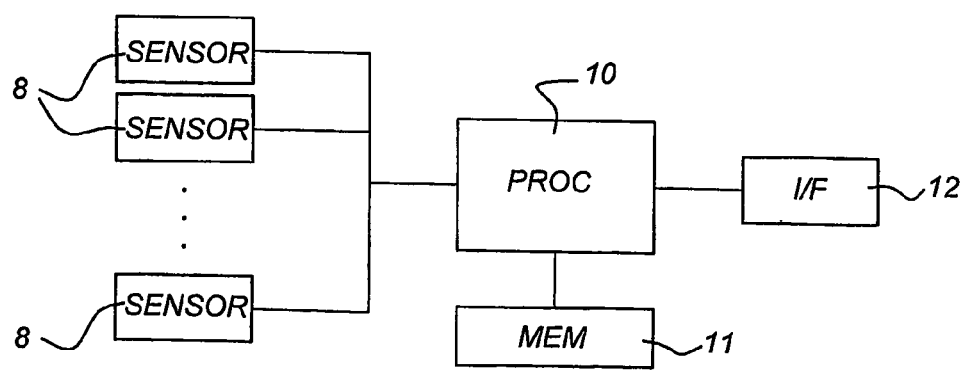

The present invention will now be explained in further detail using a number of exemplary embodiments, with reference to the accompanying drawings, in which FIG. 1 shows a cross sectional view of a rolling element bearing provided with a number of displacement sensors;

FIG. 2 shows a cross sectional view of the rolling element bearing of FIG. 1 across the line II-II; and FIG. 3 shows a block diagram of a sensor arrangement according to an embodiment of the present invention.

In FIG. 1 a cross sectional view is shown of a rolling element bearing 1, e.g. a ball bearing or roller bearing. The rolling element bearing 1 comprises an outer ring 5, an inner ring 6 and a number of rolling elements 7 (the number of rolling elements 8 being eight in the drawing). The outer ring 5 of the rolling element bearing 1 is fixed in a sensor holder 2, which forms the fixed world for the rolling element bearing 1. In the sensor holder 2 eight sensors 8 are provided at locations facing the bearing outer ring 5 with (angular) spacing corresponding to the angular spacing of the rolling elements 7 of the bearing 1. The sensors 8 may e.g. be displacement sensors or vibration sensors, known as such to the person skilled in the art.

As shown in the cross sectional view of FIG. 2, the bearing outer ring 5 is provided with a recession 3 at its outer periphery. The outer surfaces of the bearing outer ring 5 are in close contact with the sensor holder 2. The sensors 8 can thus monitor any deformation of the surface of the recession 3 of the outer ring 5 as a result of the rolling elements 7 passing by and the force vector applied to the bearing 1.

For the person skilled in the art, it will be clear that the circumferential recession 3 may also be provided in the sensor holder 2, such that a (local) deformation of the outer surface of the bearing outer ring 5 is possible. It will also be clear to the person skilled in the art, that it is possible to use sensors 8 monitoring the inner surface of the bearing inner ring 6, and that the bearing inner ring 6 (or the supporting inner ring holder analogue to the sensor holder 2) may be provided with a circumferential recession 3.

When it is known in advance, e.g. due to the construction in which the rolling element bearing 1 is used, that the force vector will be directed in mainly one direction, it is sufficient to use a smaller number of sensors 8 in the present sensor assembly. If it is e.g. known that the force vector will be predominantly directed in a single direction, it may be sufficient to provide only e.g. three sensors adjacent to each other in that direction, because that will be the only region of the outer ring 5 where deformations will occur. This simplifies the sensor assembly, while retaining sufficient accuracy.

In FIG. 1, also an x-axis and y-axis are indicated, a z-axis being defined as being orthogonal to both the x- and y-axis (extending perpendicular to the surface of the drawing). Furthermore, two rotational axes may be defined, e.g. rotational axes around the x- and y-axis, respectively. In general, the rolling element bearing 1 is in operation subjected to a force vector $\vec{f}$, comprising three force elements in the x-, y- and z-direction, respectively, and two moment elements around the x- and y-axis, respectively.

In FIG. 3, a schematic diagram is shown of a sensor arrangement according to an embodiment of the present invention. The sensors 8 are connected to processing means 10, such as a general purpose computer or a dedicated signal processing system, in order to provide the sensor signals to the processing means 10. The processing means 10 may be further connected to memory means 11 for storing parameters, data and processing results. Also, the processing means 10 may be connected to interface means 12, e.g. for providing an output of processed results on a display or printer.

The processing means 10 are arranged to process the signals from the sensors 8, and may comprise e.g. filters, amplifiers, etc., or digital signal processing means, such as analog-to-digital converters, digital filters, arithmetic logic units, etc., or a combination of both.

In a further embodiment, the processing means 10 may comprise a neural network, which is suitably trained to provide the force vector as an output, using the measurement signals of the sensors 8 as input signals. Training of neural networks is not part of this invention and is thus not further detailed in this description.

The concept of the present invention is based on determining contact loads in a roller bearing by measuring deformations or vibrations in a bearing ring 5, 6. The magnitude of the measured signal is dominated by contact loads. A modeling technique is used to determine the point of action (i.e. the contact angles) and the magnitude of the contact load. Given the point of action and the magnitude of all contact loads at a specific time, it is possible to calculate the total load on the bearing 1. The total load may comprise a vector with three orthogonal force elements and two moment elements (the moment element around the rotational axis of the bearing being of no importance).

Basic to the present invention is the understanding that any mechanical object, such as the bearing inner or outer ring 5, 6, can only be deformed according to its natural mode shapes.

The modeling technique used is based on a so called component mode synthesis (CMS) technique. According to this technique, the natural mode shapes can be described using a specific set of equations, as e.g. described in J. A. Wensing, 'On the dynamics of ball bearings', ISBN 90-36512298, which is incorporated herein by reference. These natural mode shapes may e.g. be determined using a finite element analysis model of the component 5, 6. The model may be further simplified using the finite element analysis model and the component mode synthesis technique to arrive at a simplified model describing the deformations of a component with generalised mode shapes. This will allow to transform the finite element analysis model with tens of thousands of elements to a few hundred mode shape descriptions, which are much easier and faster to solve. Using the simplified model, also, the deformation can still be calculated on all positions of the component 5, 6.

For the present invention, the deformation of the component 5, 6 due to the rolling element 7 loads may be described using a number of these generalised mode shape equations. The generalised mass, stiffness and damping matrix is determined, which describe the static and dynamic movements of the component 5, 6, in terms of mode shapes.

Then, the load vector on a bearing 1 may be reconstructed when all contact loads that act on the component 5, 6 are known. The contact loads cause a deformation which using the above described model, is described as a series of natural mode shapes. The deformation is connected to the rolling contact forces by a stiffness matrix, which is directly available from the component mode shape descriptions. The inverse of the stiffness matrix thus describes the forces as a function of the locally observed deformation of the component 5, 6 as detected by the sensors 8.

According to this modeling technique, the generalised force on a bearing ring due to contact loads can be written as $$\bar{f}_p = \frac{\partial F(\bar{\theta}, \bar{\alpha})}{\partial \bar{p}} \bar{f}_c$$

in which
$\bar{p}$ is the vector with the generalised degree of freedom describing the deformation of the bearing ring;
$\bar{f}_p$ is the corresponding generalised force vector;
F is a set of functions as used for the modeling of flexible rings;
$\bar{f}_c$ is a vector comprising the contact forces working in points with coordinates stored in the vectors $\bar{\theta}$ and $\bar{\alpha}$;
$\bar{\theta}$ is the co-ordinate in circumferential direction of the bearing ring raceway; and
$\bar{\alpha}$ is the co-ordinate perpendicular to the bearing ring raceway (for example the contact angle.

The relation between the generalised degree of freedom $\bar{p}$ and the generalised force $\bar{f}_p$ for a bearing ring (neglecting inertia properties) is:

$$\bar{f}_p = \bar{\bar{K}}_p \bar{p}$$

in which $\bar{\bar{K}}_p$ is a stiffness matrix. For a set of measurement points $\bar{s}$ where the displacements (deformations) or vibrations are measured, the following equation holds:

$$\bar{s} = \bar{\bar{T}}_m \bar{p}$$

in which $\bar{\bar{T}}_m$ is a subset of the transformation matrix $\bar{\bar{T}}$ used for the calculation of the stiffness matrix of the CMS model $\bar{\bar{K}}_p = \bar{\bar{T}}^T \bar{\bar{K}}_{FEM} \bar{\bar{T}}$. $\bar{\bar{K}}_{FEM}$ is the stiffness matrix of a FEM-model of the bearing ring.

When the above equations are combined, and adding a general force representing the other loads $\bar{f}_e(t)$ on the bearing ring, yields:

$$\bar{s}(t) = \bar{\bar{T}}_m \bar{\bar{K}}_p^{-1} \left( \frac{\partial F(\bar{\theta}, \bar{\alpha})}{\partial \bar{p}} \bar{f}_c(t) + \bar{f}_e(t) \right)$$

The unknowns in this equation are the vectors $\bar{\theta}$, $\bar{\alpha}$ and $\bar{f}_c$. Transformation of this equation in the frequency domain yields:

$$\bar{s}(\omega) = \bar{\bar{T}}_m \bar{\bar{K}}_p^{-1} \left( \frac{\partial F(\bar{\theta}, \bar{\alpha})}{\partial \bar{p}} \bar{f}_c(\omega) + \bar{f}_e(\omega) \right)$$

Due to the nature of the rolling element bearing, the contact force $\bar{f}_c$ on a certain position will vary with the ball (or roller) pass frequency $\omega_{bp}$. Also, the magnitude of the external load at the ball pass frequency may be considered almost zero, i.e. $\bar{f}_e(\omega_{bp}) \approx 0$. Therefore, at the ball pass frequency the contributions of the contact loads can be found in terms of magnitude and phase. Given the contact loads, the external load on the bearing can be calculated by summing the contact loads:

$$\bar{f} = f(\bar{f}_c, \bar{\theta}, \bar{\alpha})$$

In a special embodiment, the effect of the phase can be eliminated by placing the sensors which detect the deformation or vibration on cross sections of the bearing inner or outer ring with a mutual distance equal to the spacing between the rolling elements of the bearing (pitch). In this case, the equation reduces to $$|\bar{s}(\omega_{bp})| = \bar{\bar{T}}_m \bar{\bar{K}}_p^{-1} \frac{\partial F(\bar{\theta}, \bar{\alpha})}{\partial \bar{p}} |\bar{f}_c(\omega_{bp})|$$

In this equation, the unknowns are reduced to $|\bar{f}_c|$ and $\bar{\alpha}$. The matrices $\bar{\bar{T}}_m$ and $\bar{\bar{K}}_p$ can be directly extracted from a CMS model. The analytical shape function $F(\bar{\theta}, \bar{\alpha})$ is known by definition. Thus, by placing the sensors in pairs on a number of cross sections equal to the number of rolling elements, one can determine the contact loads using the above equation.

Given the contact loads, the external load on the bearing can be calculated by summing the contact loads according to $\bar{f} = f(\bar{f}_c, \bar{\theta}, \bar{\alpha})$.

The invention claimed is:

1. Method for determining a contact force vector acting on a rolling element bearing in operation, the rolling element bearing comprising an inner ring, an outer ring and a number of rolling elements between the inner and outer ring, the method comprising:

receiving sensor signals from a plurality of sensors measuring performance characteristics of the rolling element bearing;

processing the received sensor signals to determine the contact force vector, wherein the plurality of sensors are arranged to measure a bearing component deformation; and the step of processing comprises the step of determining the contact force vector using an inverse transformation of a finite element analysis model which describes the rolling element bearing;

the finite element analysis model is simplified using at least one generalised mode shape, the at least one generalised mode shape being a mathematical description of a natural mode deformation of a component of the rolling element bearing, such as the inner or outer ring; and the simplified model has the form:

(1)

$$\bar{s}(\omega) = \bar{\bar{T}}_m \bar{\bar{K}}_p^{-1} \left( \frac{\partial F(\bar{\theta}, \bar{\alpha})}{\partial \bar{p}} \bar{f}_c(\omega) + \bar{f}_e(\omega) \right)$$

in which (2) $s(\omega)$ is a set of measurement points where the deformations are measured at a frequency $\omega$;

(3) $T_m$ is a subset of a transformation matrix (4) T used for the calculation of a stiffness matrix $K_P$ for the simplified model, the stiffness matrix $K_P = TK_{FEM}T$, $K_{FEM}$ being a stiffness matrix of a finite element analysis model of the component;

p is the vector describing the deformation of the component;

$\theta$ is the co-ordinate in circumferential direction of the component;

$\alpha$ is the co-ordinate perpendicular to the component;

F is a set of shape functions as used for the simplified modeling of the component;

$f_c$ is a vector comprising the contact forces working in points with co-ordinates stored in the vectors O and $\alpha$; and $f_e$ is a vector comprising other forces acting on the component, and the step of determining the contact force vector f comprises the step of solving the simplified model equations for $f_c$, O and $\alpha$ and summing the contact forces according to $f=f(f_c,O,\alpha)$.

2. Method according to claim 1, in which only the sensor signals at a rolling element pass frequency $\omega_{bp}$ are considered in the simplified model.

3. Method according to claim 1, in which the sensors are positioned at the same pitch as the rolling elements, and the simplified model takes the form of |S(abbe)|=TmKp|fc(mbp) |, and the step of determining the contact force vector f comprises the step of solving the simplified model equations for |$f_c$| and $\alpha$ and summing the contact forces according to f=f ($f_c,\alpha$).

4. Method according to claim 1, in which the number of sensors is equal to the number of rolling elements.

5. Method according to claim 1, in which the contact angle of the forces acting on the rolling element bearing is equal to a predetermined value, and the number of the plurality of sensors is equal to the number of loaded rolling elements.

6. Method according to claim 2, in which the sensors are positioned at the same pitch as the rolling elements, and the simplified model takes the form of $$|\bar{s}(\omega_{bp})| = \bar{\bar{T}}_m \bar{\bar{K}}_p^{-1} \frac{\partial F(\bar{\theta}, \bar{\alpha})}{\partial \bar{p}} |\bar{f}_c(\omega_{bp})|$$

and the step of determining the contact force vector $\bar{f}$ comprises the step of solving the simplified model equations for | $\bar{f}_c$| and $\bar{\alpha}$ and summing the contact forces according to $\bar{f}=f(\bar{f}_c, \bar{\alpha})$.

7. Method according to claim 2, in which the number of sensors is equal to the number of rolling elements.

8. Method according to claim 3, in which the number of sensors is equal to the number of rolling elements.

9. Method according to claim 2, in which the contact angle of the forces acting on the rolling element bearing is equal to a predetermined value, and the number of the plurality of sensors is equal to the number of loaded rolling elements.

10. Method according to claim 3, in which the contact angle of the forces acting on the rolling element bearing is equal to a predetermined value, and the number of the plurality of sensors is equal to the number of loaded rolling elements.

11. Sensor arrangement for determining a contact force vector acting on a rolling element bearing in operation, the rolling element bearing comprising an inner ring, an outer ring and a number of rolling elements between the inner and outer ring, the sensor arrangement comprising processing means and a plurality of sensors connected to processing means, and the processing means being arranged to execute the method steps according to claim 1.

12. Sensor arrangement for determining a contact force vector acting on a rolling element bearing in operation, the rolling element bearing comprising an inner ring, an outer ring and a number of rolling elements between the inner and outer ring, the sensor arrangement comprising processing means and a plurality of sensors connected to processing means, and the processing means being arranged to execute the method steps according to claim 2.

13. Sensor arrangement for determining a contact force vector acting on a rolling element bearing in operation, the rolling element bearing comprising an inner ring, an outer ring and a number of rolling elements between the inner and outer ring, the sensor arrangement comprising processing means and a plurality of sensors connected to processing means, and the processing means being arranged to execute the method steps according to claim 3.

14. Sensor arrangement for determining a contact force vector acting on a rolling element bearing in operation, the rolling element bearing comprising an inner ring, an outer ring and a number of rolling elements between the inner and outer ring, the sensor arrangement comprising processing means and a plurality of sensors connected to processing means, and the processing means being arranged to execute the method steps according to claim 4.

15. Sensor arrangement according to claim 11, in which the bearing inner ring or outer ring are attached to a sensor holder, a circumferential recession being provided between at least part of the contacting surfaces of the inner ring or outer ring and the sensor holder.

* * * * *